United States Patent
Zheng et al.

(10) Patent No.: US 12,153,589 B2
(45) Date of Patent: Nov. 26, 2024

(54) METHODS AND APPARATUS FOR NATURAL LANGUAGE-BASED SAFETY CASE DISCOVERY TO TRAIN A MACHINE LEARNING MODEL FOR A DRIVING SYSTEM

(71) Applicant: PlusAI, Inc., Santa Clara, CA (US)

(72) Inventors: Hao Zheng, Los Altos Hills, CA (US); Yang Yang, Fremont, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/204,104

(22) Filed: May 31, 2023

(65) Prior Publication Data
US 2024/0028601 A1    Jan. 25, 2024

Related U.S. Application Data

(63) Continuation of application No. 17/870,737, filed on Jul. 21, 2022, now Pat. No. 11,698,910.

(51) Int. Cl.
*G06F 16/245* (2019.01)
*B60W 60/00* (2020.01)
(Continued)

(52) U.S. Cl.
CPC ..... *G06F 16/24578* (2019.01); *B60W 60/001* (2020.02); *G06F 16/2425* (2019.01); *G06F 16/243* (2019.01); *B60W 2420/408* (2024.01)

(58) Field of Classification Search
CPC ............ G06F 16/24578; G06F 16/243; G06F 16/2425; B60W 60/001; G60W 2420/52
See application file for complete search history.

(56) References Cited

U.S. PATENT DOCUMENTS

2018/0068358 A1*  3/2018  Hoffberg ............ G06Q 30/0207
2018/0373963 A1   12/2018  Lo et al.
(Continued)

FOREIGN PATENT DOCUMENTS

CN      112269939 A    1/2021
WO      2020/224910 A1  11/2020

OTHER PUBLICATIONS

International Search Report and Written Opinion mailed Oct. 19, 2023 in International Application No. PCT/US2023/028392, 13 pages.
(Continued)

*Primary Examiner* — Truong V Vo
(74) *Attorney, Agent, or Firm* — Sheppard Mullin Richter & Hampton LLP

(57) ABSTRACT

A safety case discovery system includes a scenario framework and safety protocols for edge cases. The safety case discovery system receives sensor data generated by at least one sensor during operation of a vehicle and stores the sensor data in a data warehouse. The data warehouse can be queried based on a predefined scenario description to produce a subset of records which are ranked based on a relevancy of the records to the predefined scenario description. The safety case discovery system deduplicates the ranked results to produce edge cases and updates the safety protocol. The safety case discovery system can train a machine learning model vehicle based on the edge cases, to produce a trained machine learning model for optimizing the driving system.

20 Claims, 5 Drawing Sheets

(51) Int. Cl.
*G06F 16/242* (2019.01)
*G06F 16/2457* (2019.01)

(56) References Cited

U.S. PATENT DOCUMENTS

2021/0303956 A1  9/2021  Thorsen et al.
2022/0161815 A1  5/2022  Van Beek et al.

OTHER PUBLICATIONS

U.S. Appl. No. 17/735,823, filed May 3, 2022, inventor Ankur Agarwal.

* cited by examiner

| 1.1 Class | 1.2 Type | 1.3 Sub-type | 1.4 Scenario | 1.5 Edge Case |
|---|---|---|---|---|
| Safety-related Scenario | Traffic disturbances | Merging vehicle | Vehicle on the merging lane merges to ego lane | |
| | | Cut-in vehicle | Vehicle cut-in | |
| | | Traffic participants | Cones, waterhorses, triangles board | |
| | | | Vehicle on the emergency lane | |
| | | | Ultra-wide truck | Vehicles rear-ended/door on top of hits lane marking, obstructing part of the lane |
| | | Other objects | Animals, bicycle, fallen object | Twin size mattress blocking off road |
| | | Overhead structures | Passable object | |
| | | | Overhead object | |
| | | | Road surface | |
| | Perception disturbance | Sensor limitation | Camera limitation | |
| | | AD sensors mounting | Sensors positioning | |
| | | | Vibration | |
| | Road disturbance | Lane marker | One side lane marks missing | |
| | | | Two side lane marks missing | |
| | | | Lane mark unclear | |
| | | | Mixed lane marks | |
| | | Road surface | Potholes in front | |
| | | | Bumper in front | |
| | | | Road geometry | |
| | Ego Vehicle disturbance | Body input | Vehicle characters | |
| | | | Road surface condition | |
| | | Tire input | Tire condition | |

FIG. 2

METHODS AND APPARATUS FOR NATURAL LANGUAGE-BASED SAFETY CASE DISCOVERY TO TRAIN A MACHINE LEARNING MODEL FOR A DRIVING SYSTEM

CROSS-REFERENCE TO RELATED APPLICATIONS

This application is a continuation of U.S. patent application Ser. No. 17/870,737, filed Jul. 21, 2022 and entitled "METHODS AND APPARATUS FOR NATURAL LANGUAGE-BASED SAFETY CASE DISCOVERY TO TRAIN A MACHINE LEARNING MODEL FOR A DRIVING SYSTEM", which is incorporated herein by reference.

FIELD

The present disclosure generally relates to the field of natural language-based machine learning for. In particular, the present disclosure is directed to methods and apparatus for natural language-based safety case discovery and related training of machine learning models for a driving system.

BACKGROUND

Driving systems typically rely heavily on machine learning or artificial intelligence to recognize surrounding obstacles in real time and ensure the safety of the vehicle and its passengers and surroundings. Data and information about a vehicle's surroundings are used to train machine learning models to detect common driving scenarios and incidents. Even trained machine learning models, however, are often unable to detect and categorize uncommon driving scenarios. Some of the most uncommon driving scenarios are fatal, resulting in liabilities and distrust in driving systems. Additionally, overburdening a machine learning model with superfluous training data can lead not only to inefficient or slow response reactions for certain obstacles, but also undesirable false positive or false negative assumptions about driving scenario classification.

SUMMARY

In some embodiments, a safety case discovery system includes a scenario framework and safety protocols for edge cases. The safety case discovery system receives sensor data generated by at least one sensor during operation of a vehicle and stores the sensor data in a data warehouse. The data warehouse can be queried based on a predefined scenario description to produce a subset of records which are ranked based on a relevancy of the records to the predefined scenario description. The safety case discovery system deduplicates the ranked results to produce edge cases and updates the safety protocol. The safety case discovery system can train a machine learning model vehicle based on the edge cases, to produce a trained machine learning model for optimizing the driving system.

In one or more embodiments, an apparatus for natural language-based safety case discovery for a driving system is presented. The apparatus includes a processor and a memory operably coupled to the processor. The memory stores instructions to cause the processor to receive sensor data generated by at least one sensor located at a vehicle (e.g., an autonomous vehicle) during operation of the vehicle, and to identify a plurality of features associated with the sensor data. The memory also stores instructions to cause the processor to generate a multidimensional representation of the sensor data based on the plurality of features, and to query a queryable search engine index based on the multidimensional representation of the sensor data, to produce a query result. The query result includes a subset of records from multiple records of the queryable search engine index. The memory further stores instructions to cause the processor to rank each record from the subset of records based on a relevancy of that record to the multidimensional representation of the sensor data, to produce a ranked set of records. The memory further stores instructions to identify at least one edge case based on the ranked set of records, and train a machine learning model associated with the vehicle based on the at least one edge case to produce a trained machine learning model.

In one or more embodiments, a non-transitory, processor-readable medium for a natural language-based safety case discovery for a driving system is presented. The non-transitory, processor-readable medium stores instructions that, when executed by a processor, cause the processor to receive sensor data generated by at least one sensor located at a vehicle during operation of the vehicle, and to identify a plurality of features associated with the sensor data. The non-transitory, processor-readable medium further stores instructions to cause the processor to generate a multidimensional representation of the sensor data based on the plurality of features, and to query a queryable search engine index based on the multidimensional representation of the sensor data, to produce a query result. The query result includes a subset of records from multiple records of the queryable search engine index. The non-transitory, processor-readable medium further stores instructions to cause the processor to rank each record from the subset of records based on a relevancy of that record to the multidimensional representation of the sensor data, to produce a ranked set of records. The non-transitory, processor-readable medium further stores instructions to cause the processor to receive a signal representing a user selection of at least one edge case from the ranked set of records for inclusion in a safety protocol, and to cause an update to the safety protocol such that the safety protocol includes the at least one edge case.

In one or more embodiments, a method for natural language-based safety case discovery for a driving system is presented. The method includes receiving, via a processor operatively coupled to a memory, sensor data generated by at least one sensor located at a vehicle during operation of the vehicle. The processor and the memory can be located remote from the vehicle or located onboard the vehicle. The method further includes identifying a plurality of features associated with the sensor data, generating a multidimensional representation of the sensor data based on the plurality of features, and querying a queryable search engine index based on the multidimensional representation of the sensor data, to produce a query result. The query result includes a subset of records from a plurality of records of the queryable search engine index. The method further includes ranking each record from the subset of records based on a relevancy of that record to the multidimensional representation of the sensor data, to produce a ranked set of records. The method then includes receiving a signal representing a user selection of at least one edge case from the ranked set of records for inclusion in a safety protocol, and causing an update to the safety protocol such that the safety protocol includes the at least one edge case.

BRIEF DESCRIPTION OF THE DRAWINGS

The drawings show aspects of one or more embodiments of the disclosure. However, it should be understood that the present disclosure is not limited to the precise arrangements and instrumentalities shown in the drawings, wherein:

FIG. 2 is an example table of a natural language-based safety protocol of a scenario framework, the safety protocol having a hierarchical structure, in accordance with an embodiment.

DETAILED DESCRIPTION

Figure 1A:
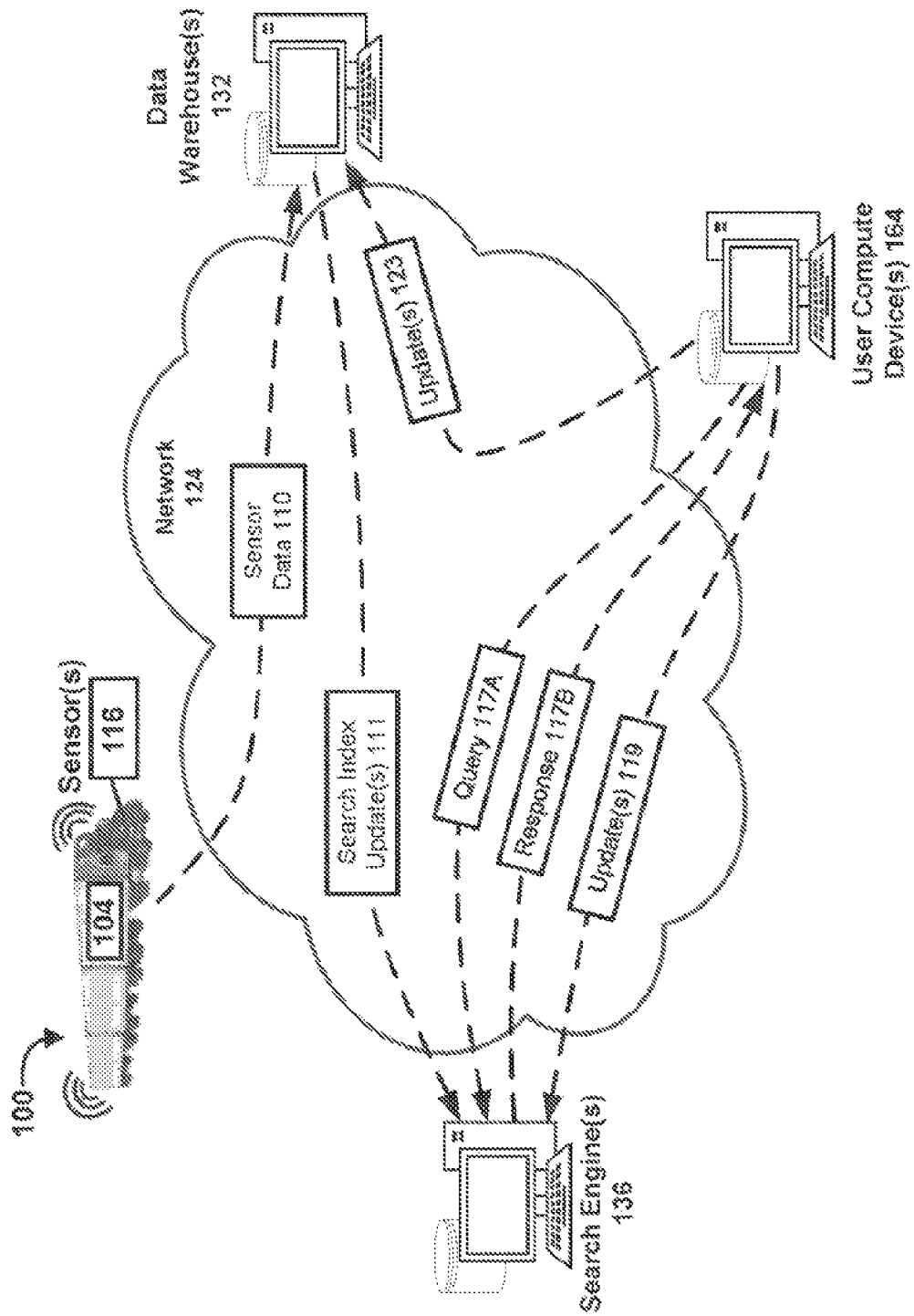
FIG. 1A is a system diagram showing a networked arrangement of compute devices for performing safety case discovery, in accordance with some embodiments.

During operation of a vehicle (such as an autonomous vehicle), sensors onboard the vehicle can generate a large volume of, and a wide variety of, data ("sensor data") that is potentially relevant to the safe operation of the vehicle. Systems and methods described herein facilitate the efficient "mining" of such sensor data, after it has been collected, to identify scenarios of interest (such as scenarios that are sufficiently "rare," referred to herein as "edge cases"), to augment a scenario framework, and/or to retrain one or more machine models (e.g., machine model(s) related to the autonomous driving ("AD") operations of an autonomous vehicle). The sensor data can include, for example, one or more of: camera data, lidar data, radar data, global positioning system (GPS) data, or inertial measurement unit (IMU) data. In some implementations, the sensor data is converted into a set of features, which may be multidimensional. For example, for image data (e.g., a single image frame or a sequence of images, optionally with embedded timestamp(s)), pixel data can be extracted, optionally merged with additional pixel data, and used to generate a matrix. The multidimensional data (e.g., matrix or matrices) can in turn be converted into a single vector (e.g., for a single image) or a set of vectors (e.g., for a series of images) and used to query a search engine containing hierarchical scenario data. In response to the query, a query result is returned that specifies one or more candidate classifications or categories for the sensor data, and/or an indication of how rare or common the sensor data is. This query result can be used to at least one of: (1) classify the sensor data as a particular type of scenario, and store a representation of the sensor data with an indication of its classification or category (collectively, scenario data) in a searchable/queryable data warehouse; (2) updating the search engine by adding the scenario data to the search engine (optionally in response to a user review and instruction); or (3) train/retrain one or more AD machine learning models for subsequent testing and/or deployment to one or more vehicles.

A variety of scenarios, objects, behaviors, and environments can be monitored from a vehicle, not only from the primary and peripheral viewpoints of a human driver located in the vehicle, but also from the driver's blind spots surrounding the vehicle. The vehicle's surroundings can be analyzed to identify one or more driving scenarios or situations, based on data generated by sensors of the vehicle, and such data can be classified, for example as part of a process for determining one or more appropriate responses ("safety responses") to the scenario(s)/situations. A "driving scenario," as used herein, can refer to a postulated sequence or development of events (and associated data) involving an operation of a vehicle. For example, driving scenarios can include commutes, traffic, car accidents, animal roadkill, and/or the like. In some implementations, a vehicle (e.g., an autonomous vehicle) can quickly detect in real time its own dynamic surroundings during operation, store associated data, and in some instances used the data to make appropriate vehicular maneuvers. Systems set forth herein can include one or more search engines and/or data warehouses, either of which may include an indexing system, implemented using one or more compute devices that are remote from the vehicle and/or one or more compute devices that are onboard the vehicle. The indexing system can include/store sequence data (e.g., spanning a duration of up to a few seconds), associated with scenario data such as image frames and video frames.

In some embodiments, one or more vehicles can capture, detect and/or generate data associated with a driving scenario (scenario data), and can subsequently cause transmission of the scenario data (e.g., via direct download and/or via a cellular network) to an indexing system of the one or more search engines and/or data warehouses. The indexing system can then construct features and/or indices for the scenario data, for example using a sequential model such as a recurrent neural network (RNN) to produce sequential features over a sliding window of frames. Alternatively or in addition, a natural language-based query can be identified based on at least a subset of the scenario data (e.g., based on the indices constructed for the scenario data), and the natural language-based query can be used to query the one or more search engines and/or data warehouses. The indexing of the scenario data can be said to be performed in one or more "backend" systems, or in an "offline" manner (e.g., remotely from the vehicle), after the data associated with the driving scenario has been "backhauled" or transmitted from the vehicle to the backend indexing system(s).

In some implementations, a copy of the indexing system located remotely from (off-board) the vehicle can be copied into/uploaded to the memory of one or more vehicles and/or integrated into the vehicle and used to discover edge cases on the vehicle. Alternatively or in addition, a separate search engine and/or indexing system can be generated and/or stored by the one or more vehicles, and used to match newly observed sensor data (which may include frame sequence data and/or time series data) against the search engine and/or indexing system, to find similar cases or matching descriptions of the newly observed sensor data and take appropriate action (e.g., by modifying an operational constraint of the vehicle).

As used herein, a scenario framework can include one or more search engines and/or one or more data warehouses, any of which may include an indexing system for generating indices for newly-received sensor data. Data stored within the scenario framework (i.e., within the search engine(s) and/or the data warehouse(s)) can have a hierarchical structure, with multiple different data layers (referred to herein as "safety layers") each represented by one or more associated natural language descriptors, to optimize (or improve) query output accuracy and efficiency. The scenario framework can be populated with safety cases and/or natural language-based scenario descriptions for safety cases, where the safety cases can include, but are not limited to, edge cases. In some implementations, the scenario framework can also include natural language-based descriptions of safety protocol(s) to define/store representations of the safety cases, driving scenarios, and/or edge cases in the scenario framework. As used herein, a "safety case" refers to a set or collection of descriptive labels and/or data that represent circumstances related to a vehicle and having varying associated risks or potential for being a safety concern. A safety case may be an "edge case" when, at the time it is initially identified/defined, it has a rareness score exceeding a predefined value. A safety case can be defined by a plurality of parameters, such as a classification ("class"), a type, a sub-type, a scenario description, etc. Each such parameter can be defined qualitatively (e.g., using natural language) and/or quantitatively (e.g., rareness values, risk scores, sensor data values, etc.). The hierarchical structure can be used, at least in part, to organize multiple driving scenarios and/or safety cases based on their specific categories and inherent/associated relationship(s). For example, the scenario framework can include an initial safety layer (e.g., a first layer) with multiple categories of classifications. The first layer can be represented as the highest layer in the hierarchical structure of the scenario framework. One category of classification can include a classification for safety-based scenarios. The second/subsequent safety layer can include scenario types for each classification in the first safety layer. For example, the second safety layer can include scenario types such as "traffic disturbance," "perception disturbance," "road disturbance," "ego and/or behavior disturbance," and/or the like. The third safety layer can include multiple sub-types for each scenario type from the second safety layer. For example, the traffic disturbance scenario type can include sub-types in the third safety layer, the sub-types including, for example, such as "merging vehicle," "cutting vehicle," "traffic participants," "surrounding obstacles," and/or the like. Following the third safety layer, the fourth safety layer can include scenarios based on the sub-type of the preceding third safety layer. For example, the scenarios for traffic participants can include "pedestrians," "cones," "vehicle on emergency lane," "ultra-wide truck," and/or the like. In some cases, the fourth safety layer of scenarios can include relatively common driving scenarios or occurrences. The scenario framework hierarchy can implement a fifth safety layer of edge cases that provide even further coverage of the specific scenarios of the fourth safety layer. For example, edge cases for "pedestrians" can include "thirty elementary school students crossing a road with inconsistent speeds," "skateboarder," "two crossing pedestrians leaving large gap in the middle of the road," and/or the like. The fifth safety layer of edge cases can provide additional coverage which can enable the natural language-based query to produce relevant results. In some implementations, the fifth safety layer can be populated with safety cases/edge cases sampled from or identified by a machine learning model. To expand the fifth safety layer, the machine learning model can be trained using training data and/or validation data augmented with specific edge cases, e.g., for more effective identification of new edge cases (which, in turn, can be used to populate the fifth safety layer or any other safety layer). The descriptions for the fifth safety layer can be provided, for example, by a query of a queryable search engine indexing system containing image and video data captured from driving scenarios.

In some embodiments, the scenario framework can include more than five safety layers, each defined based on edge cases, outlier data sets, specific predefined scenarios, scenarios that are known or determined to be uncommon/rare, etc. Alternatively, the scenario framework can include fewer than five safety layers (e.g., four, three, two, or one safety layer). In general, the granularity of data can vary across data layers, and the descriptions at higher layers of the scenario framework can be more generic while descriptions at lower layers of the scenario framework are more specific. In some implementations, the scenario framework can have a hierarchical structure that includes a plurality of nodes. In some implementations, the scenario framework may include one or more unpopulated safety layers and one or more populated safety layers, and newly-received sensor data (which may include frame sequence data and/or time series data) can be used to populate the unpopulated safety layers. In some implementations, one or more first safety layer classifications can include types in the at least one future safety layer that do not have third safety layer sub types. This can occur, for example, when entries/contents of the at least one future safety layer provides full/sufficient coverage (e.g., based on a predefined metric or threshold accuracy) of the first safety layer's category/categories (i.e., further specificity is not needed to fully describe a scenario).

The natural language-based query can output one or more safety cases ("query results" or "results") from a search engine indexing system based on the natural language descriptors, which are then ranked based on relevancy to the predefined natural language descriptions. The query result(s) can include one or more similar safety cases. A "safety case," as used in this disclosure, can refer to a categorized scenario that is classified within a scenario framework. In some instances, safety cases can include edge cases (e.g., once they are classified into the scenario framework). An "edge case," as used in this disclosure, can refer to a description of an uncommon ("rare") driving scenario, safety case, or outlier situation. In some cases, the top ranked results are used to optimize (or improve) edge case classification for the scenario framework. In some implementations, the edge cases can be ranked by human intervention. The ranking can include determining whether the safety cases output from/included in the query results are uncommon enough to be an edge case, e.g., based on their relationship to other output and/or known safety cases and/or how frequently the safety case(s) are observed. In some cases, the query results can include one or more similar safety cases. The indexing system can use a ranking system to rank the query results based on rareness and/or similarity, where the indexing system can deduplicate the ranked query results. "Deduplicate," as used herein, can refer to eliminating one or more similar query results. For example, the frame sequence (or time series) data can contain image(s)/video of a dead squirrel on the road. The indexing system can query the search engine index with a natural language-based scenario description of "dead squirrel" to produce a query result containing one or more safety cases for "dead squirrel." In some cases, the query can output safety cases based on the existing scenario framework. Such safety cases can include, but are limited to, "traffic disturbance scenarios," "objects," "animals," "fallen objects," "dead animals," "small animal," or the like. The indexing system can rank (or facilitate the ranking of) the query results based on the similarities of the results, where the rareness of a safety case is inversely related to the frequency of occurrence of (i.e., the number of) similar safety cases from the query results. Populating the search engine can enable the indexing system to effectively produce query results efficiently and/or accurately for natural language-based queries. In some implementations, sensor data can be captured/generated that represents a variety of different driving objects, scenarios, and/or the like. The indexing system can receive natural language-based scenario description(s) defining the variety of objects or scenarios from the sensor data and query the queryable search engine index using the natural language-based scenario description(s).

The indexing system can for example be located, and its functions can be performed, "off-board" the vehicle (e.g., at one or more remote compute devices in wireless network communication with the vehicle), such that the machine learning model can be trained in an offline "pipeline." The trained machine learning model(s) can be delivered/deployed to the vehicle or copied into the vehicle's memory once sufficiently trained. In some cases, the vehicle can continue to capture, detect and/or generate additional data and transmit the additional data to the indexing system such that the indexing system can perform further natural language-based queries and machine learning model training. Updated versions of the machine learning model, or updates to the machine learning model, can in turn be transmitted to the vehicle, deployed on the vehicle, or copied into the vehicle's memory.

In some implementations, the machine learning model can be iteratively trained to produce increasingly robust machine learning models as additional incoming sensor data is captured by the vehicle's sensors. The sensor data can include any combination of (but is not limited to) camera data (e.g., image frames and/or video frames), LIDAR data, radar data, and/or other sensor data. In some cases, multiple edge cases can be captured/defined (e.g., based on a common set of sensor data or captured sample) that are sufficiently similar to one another so that the machine learning model can adequately model/generalize the scenario framework, for example when the edge case(s) are rare and/or "difficult to learn." The multiple edge cases can, in turn, be returned as results in response to the natural language-based queries. Having multiple query result(s) can be beneficial in properly managing data distribution, and/or can facilitate modifications to data of the indexing system (e.g., by incorporating external input(s)), for example to reduce and/or create bias for the indexing system. In some cases, the scenario framework can be used to validate the indexing system and/or results from the natural language-based queries. The indexing system can also deduplicate query result(s) in order to reduce excessive similar edge cases to improve the interpretation of the edge cases (e.g., by human users). The indexing system can also deduplicate query results (e.g., removing query results when multiple results are identical) to reduce the dataset set size (of driving scenarios and/or edge case), for example to facilitate interpretation by human users and/or to increase the speed of interpretation.

The indexing system is located remotely from the vehicle and can be used to enrich and improve and/or expand a scenario framework for driving scenarios based on the natural language descriptions of the scenario framework. The scenario framework contains natural language descriptions of safety cases and/or safety protocol(s), where the indexing system can add more safety cases (or reduce) based on one or more queries of the search engine index containing a plurality of sensor data. The scenario framework can include, but not limited to, a hierarchical structure to classify driving scenarios for which the indexing system can perform a natural language-based query using natural language descriptions. The natural language descriptions can be used to categorize large collections of edge cases containing natural language descriptions of specific driving scenarios in the natural language-based scenario framework. The search engine index can store a plurality of sensor data, and can output safety cases in response to queries that include natural language-based scenario descriptions of sensor data. The indexing system also samples the safety cases resulting from one or more queries using a machine learning model to enhance the scenario framework. The indexing system can expand the safe framework with safety cases based on the natural language descriptions of the scenario framework.

The indexing system can also evaluate "rareness" of edge cases based on similarities shared (or not shared) from the query results. In some cases, the indexing system can integrate human input or a ranking system to evaluate rareness, commonality, or the like, to narrow down the query results. The evaluation of the query results is beneficial to identify rare driving scenarios (edge/corner cases) to expand the scenario framework. The identification and classification of edge cases can also be beneficial in developing safety protocols for rare driving scenarios.

The indexing system can also be used to capture more safety cases, such as edge cases based on the scenario framework to expand a machine learning model training and/or validation set for automatic driving of the vehicle(s). The indexing system can augment the machine learning model training set with selected edge cases to better generalize and handle specific types of corner cases found in driving scenarios. This is so, at least in part, to target specific areas of the scenario framework by better recognizing edge cases in the targeted specific areas. For instance, the scenario framework can include categories of road objects such as animals, equipment, debris, or the like. The training set can be augmented to include edge cases specifying animals on the road to expand the edge case of animals on the road in the category of road objects. Augmented machine learning machine learning training data can be beneficial in handling corner cases and/or edge cases for the scenario framework. The selection of edge cases in the training data can also create bias for the machine learning model to improve categorization of edge cases for which safety protocols and/or capabilities can be improved. The indexing system can capture sensor data and more edge cases based on the scenario framework to improve the machine learning model and the automatic driving capabilities of the vehicle.

The indexing system can also explore and expand the scenario framework by leveraging the search engine index to compose new natural language descriptions. For instance, the search engine index can be queried with unknown or unfamiliar natural language description captured by the vehicle or multiple vehicles. In some cases, the search engine index can be expanded to recognize new natural language descriptions of driving scenarios. In some implementations, the search engine index can be supported by human intervention to compose new natural language descriptions for future queries. As the vehicle or multiple vehicles continues to capture/generate sensor data during operation, the off-board indexing system can expand the scenario framework and/or the search engine index with new natural language descriptions for data collected by the vehicle(s). The indexing system can also discover edge cases on the vehicle(s) by running a separate search engine to match newly observed sensor data against the search engine to find similar cases or matching natural language descriptions based on the newly observed sensor data. The separate search engine can be distinct from the search engine index described previously, where the separate search engine can include a copy of the search engine index. By running a separate search engine, the indexing system can identify and/or discover new edge cases which can be used to expand the scenario framework and/or the search engine index.

FIG. 1A is a system diagram showing a networked arrangement of compute devices for performing safety case discovery, in accordance with some embodiments. As shown in FIG. 1A, one or more vehicles (e.g., autonomous vehicles) 100 are communicably coupled, via a wireless communications network 124, to one or more search engines 136, one or more user compute devices 164, and one or more data warehouses 132. The one or more vehicles 100 can be a fleet of vehicles. Each vehicle from the one or more vehicles can include one or more onboard sensors 116 and one or more onboard compute devices 104 (e.g., including a processor, memory, and transceiver). Sensor data 110 generated by the one or more vehicles 100 can be transmitted to the search engine(s) 136, the user compute device(s) 164 and/or the data warehouse(s) 132 for storage and/or processing. Queries 117A can be sent from the user compute device(s) 164 to the search engine(s) 136, and responses 117B can be returned to the user compute device(s) 164 from the search engine(s) 136. Alternatively or in addition, updates 119 can be sent from the user compute device(s) 164 to the search engine(s) 136, as discussed further below. The queries 117A can include multidimensional representations of the sensor data 110, as discussed further below. Queries 121A can be sent from the user compute device(s) 164 to the data warehouse(s) 132, and responses 121B can be returned to the user compute device(s) 164 from the data warehouse(s) 132. Alternatively or in addition, updates 123 can be sent from the user compute device(s) 164 to the data warehouse(s) 132, as discussed further below. The queries 121A can include natural language descriptions of scenarios, as discussed further below.

Figure 1B:
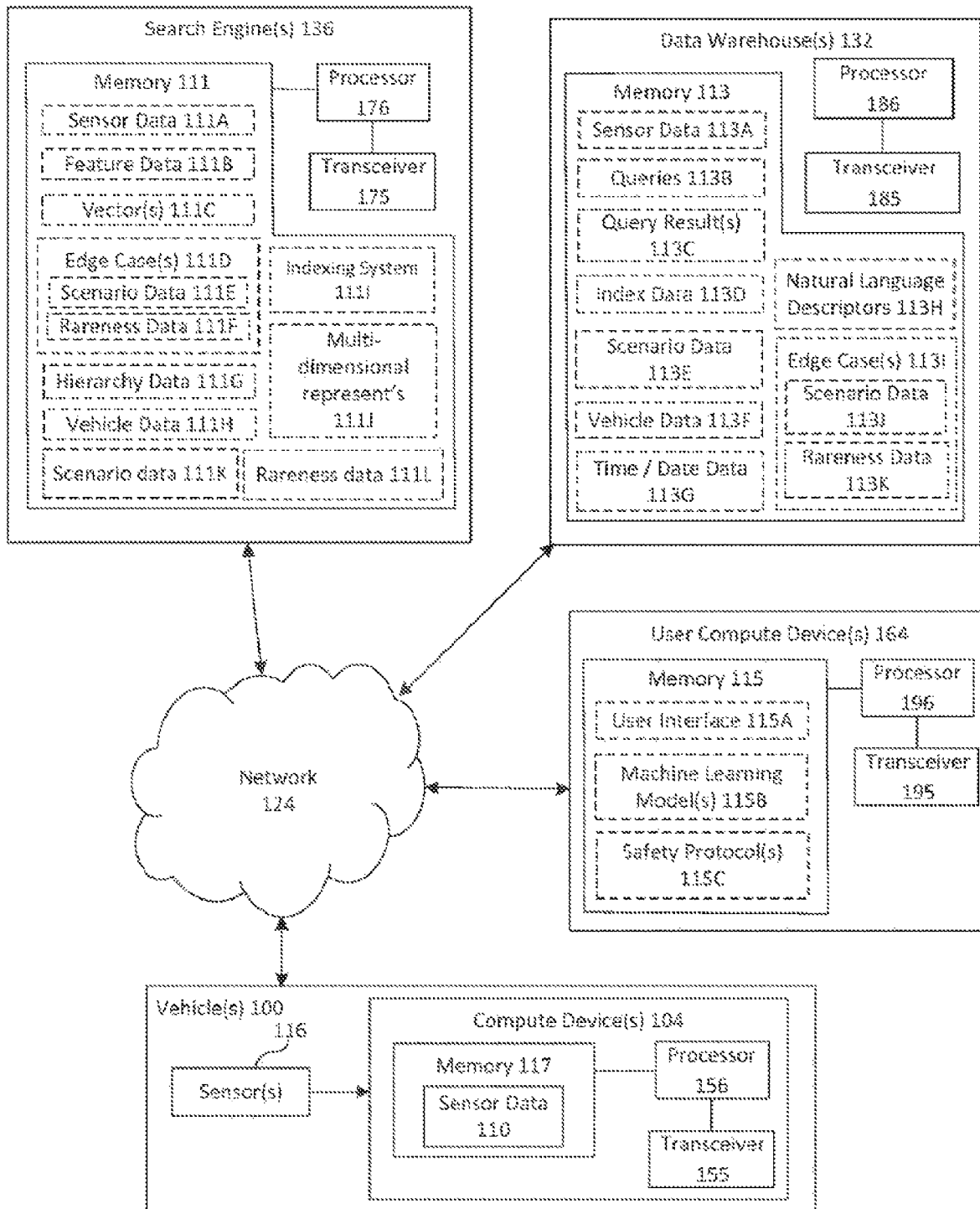
FIG. 1B is a system diagram showing further details of the compute devices of FIG. 1A, in accordance with some embodiments.

FIG. 1B is a system diagram showing further details of the compute devices of FIG. 1A, in accordance with some embodiments. FIG. 1B includes one or more vehicles 100, one or more search engine(s) 136, one or more data warehouses 132, and one or more user compute devices 164 each in operable communication with one another via a wireless communications network 124. The vehicle(s) 100 can operate in a manual driving mode, a partially autonomous mode, or a fully autonomous driving mode. In some implementations, the vehicle 100 can include an autonomous vehicle. The autonomous vehicle can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level 1 but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

Each of the one or more search engine(s) 136, the one or more data warehouses 132, and the one or more user compute devices 164 can include, without limitation, a microcontroller, microprocessor, digital signal processor (DSP) and/or system on a chip (SoC) as described in this disclosure. Alternatively or in addition, each of the one or more search engine(s) 136, the one or more data warehouses 132, and the one or more user compute devices 164 can include, be included in, and/or connect with a mobile device such as a mobile telephone or smartphone. Any of the one or more search engine(s) 136, the one or more data warehouses 132, and the one or more user compute devices 164 can include a single compute device operating independently or can include two or more compute devices operating in concert, in parallel, sequentially or the like; two or more of the one or more search engine(s) 136, the one or more data warehouses 132, and the one or more user compute devices 164 can be included together in a single compute device or in two or more compute devices. Each of the one or more search engine(s) 136, the one or more data warehouses 132, and the one or more user compute devices 164 can interface or connect with one or more additional devices as described below in further detail via a network interface device. A network interface device (not shown) can be used to connect any of the one or more search engine(s) 136, the one or more data warehouses 132, and the one or more user compute devices 164 to one or more of a variety of networks, and one or more devices. Examples of a network interface device include, but are not limited to, a network interface card (e.g., a mobile network interface card, a LAN card), a modem, and any combination thereof. Any of the one or more search engine(s) 136, the one or more data warehouses 132, and the one or more user compute devices 164 can be or include one or more compute devices dedicated to data storage, security, dispersal of traffic for load balancing, and the like. Any of the one or more search engine(s) 136, the one or more data warehouses 132, and the one or more user compute devices 164 can distribute one or more computing tasks as described below across multiple compute devices, which can operate in parallel, in series, redundantly, or in any other manner used for the distribution of tasks or memory among compute devices.

Any of the one or more search engine(s) 136, the one or more data warehouses 132, and the one or more user compute devices 164 can be designed and/or configured to perform any method, method step, or sequence of method steps in any embodiment described in this disclosure, in any order and with any degree of repetition. For instance, one or more search engine(s) 136 can be configured to perform a single step or sequence recurrently until a desired or commanded outcome is achieved; repetition of a step or a sequence of steps can be performed iteratively and/or recursively using outputs of previous repetitions as inputs to subsequent repetitions, assembling inputs and/or outputs of repetitions to produce an aggregate result, reduction or decrement of one or more variables such as global variables, and/or division of a larger processing task into a set of iteratively addressed smaller processing tasks. Any of the one or more search engine(s) 136, the one or more data warehouses 132, and the one or more user compute devices 164 can perform any step or sequence of steps as described in this disclosure in parallel, such as simultaneously and/or substantially simultaneously performing a step two or more times using two or more parallel threads, processor cores, or the like; division of tasks between parallel threads and/or processes can be performed according to any protocol suitable for division of tasks between iterations. Similarly, there are various ways in which steps, sequences of steps, processing tasks, and/or data can be subdivided, shared, or otherwise dealt with using iteration, recursion, and/or parallel processing.

As shown in FIG. 1B, the vehicle 100 includes one or more sensors 116 and one or more compute devices 104, where the compute device(s) 104 includes a transceiver 155, a processor 156, and a memory 117, each operatively coupled to one another (e.g., via a system bus) and/or to the vehicle 100. In some implementations, the processor 156, sensor(s) 116, and/or memory 172 are operatively coupled to one another via a control area network (CAN) bus (not shown in FIG. 1B) included in the vehicle 100. The processor 156 can be, for example, a hardware based integrated circuit (IC), or any other suitable processing device configured to run and/or execute a set of instructions or code. For example, the processor 156 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 156 can be configured to perform any of the methods and/or portions of methods discussed herein.

The search engine(s) 136 includes a processor 176 operatively coupled to a memory 111 and a transceiver 175 configured for communication via the network 124. The processor 176 can be, for example, a hardware based integrated circuit (IC), or any other suitable processing device configured to run and/or execute a set of instructions or code. For example, the processor 176 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 176 can be configured to perform any of the methods and/or portions of methods discussed herein. The memory 111 stores one or more of sensor data 111A, feature data 111B, vector(s) 111C, edge case(s) 111D (optionally including scenario data 111E and/or rareness data 111F), hierarchy data 111G. vehicle data 111H, an indexing system 111I (also referred to herein as a "search engine index"), multi-dimensional representations 111J of sensor data, scenario data 111K, or rareness data 111L as discussed herein.

The data warehouse(s) 136 includes a processor 186 operatively coupled to a memory 113 and a transceiver 185 configured for communication via the network 124. The processor 186 can be, for example, a hardware based integrated circuit (IC), or any other suitable processing device configured to run and/or execute a set of instructions or code. For example, the processor 186 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 186 can be configured to perform any of the methods and/or portions of methods discussed herein. The memory 113 stores one or more of sensor data 113A, queries 113B, query result(s) 113C, index data 113D, scenario data 113E, vehicle data 113F, time/date data 113G, natural language descriptors 113H, or edge case(s) 111D (optionally including scenario data 111E and/or rareness data 111F). Any of index data 113D. scenario data 113E, edge case(s) 113I, and natural language descriptors 113H can be stored as pluralities of records (e.g., in a database or data storage repository) and/or can have a hierarchical format or storage structure.

The user compute device(s) 164 includes a processor 196 operatively coupled to a memory 115 and a transceiver 195 configured for communication via the network 124. The processor 196 can be, for example, a hardware based integrated circuit (IC), or any other suitable processing device configured to run and/or execute a set of instructions or code. For example, the processor 196 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 196 can be configured to perform any of the methods and/or portions of methods discussed herein. The memory 115 stores one or more of a user interface 115A (E.g., a graphical user interface (GUI)), one or more machine learning models 115B (e.g., AD machine learning models), and one or more safety protocol(s) 115C (optionally stored in a hierarchical format and/or stored in records of a database or other data storage repository). An example of the one or more safety protocol(s) 115C is shown and described below, with reference to FIG. 2.

During operation of the vehicle(s) 100, the sensor(s) 116 can collect/generate/detect sensor data 110, which may include frame sequence data and/or time series data. The sensor data can include, for example, one or more of: camera data, lidar data, radar data, global positioning system (GPS) data, or inertial measurement unit (IMU) data. "Time series data," as used herein, can include sequential data captured by sensors over short intervals of time (e.g., less than 10 seconds, or about 100 milliseconds, etc). Time series data can include images and/or a video input containing multiple image frames. For example, the time series data can include multiple frames being associated with about a 0.1 second capture duration. In some cases, time series data can include sensor data captured by the sensor 116 during operation of the vehicle 100. For example, the sensor data can be consistent with the sensor data found in U.S. patent application Ser. No. 17/735,823, filed May 3, 2022 and titled "Determining Acceptable Responses for Navigating a Vehicle that Accounts for Eternal Conditions of the Vehicle," which is incorporated by reference herein in its entirety. The memory can include (e.g., store) sensor data captured by the at least one sensor 116. The sensor data can be collected by the sensor(s) 116. In some cases, the sensor data 110 can include, for example, one or more of camera data, lidar data, radar data, global positioning system (GPS) data, inertial measurement unit (IMU) data, and/or the like from multiple sensors 116. The sensor data 110 can also include, for example, information about a surrounding environment of the vehicle 100, such as attributes (e.g., type, size, speed, position, relative distance, acceleration, etc.) of nearby obstacles (e.g., vehicles, buildings, pedestrians, lane dividers, sidewalks, etc.), attributes (e.g., location and size) of shoulder areas, attributes (e.g., shape and grade) of a road, weather conditions, and/or the like. The sensor data 110 can also include information about the vehicle 100 itself, such as the vehicle's 100 speed, location, tire pressure, internal temperature, audio being played, lights that are on or off, windshield wiper settings, window settings, tractor and trailer state, and/or the like. Additionally or alternatively, such information about the vehicle 100 itself can be indicated by CAN data, as discussed below. The sensor data can also include information about a driver of the vehicle 100, such as the driver's posture, facial expression, heart rate, speech, movements, mental state, and/or the like. If the vehicle 100 is a tractor and trailer, sensor data about the tractor and trailer state can include for example information about the tractor and trailer, such as if and/or to what extent the trailer is swaying.

The sensor(s) 116 can be used to observe and gather any information that could be useful for performing the techniques discussed herein, such as information associated with a surrounding environment of the vehicle 100 (e.g., nearby obstacles and their attributes, lane markers and their attributes, weather, etc.), information associated with the vehicle 100 itself (e.g., speed, acceleration rate, location, lane position, etc.), and/or information about a driver of the vehicle 100 (e.g., posture, facial expression, heart rate, speech, movements, mental state, etc.). The sensor(s) 116 can include, for example, at least one of a camera, a radar, a LIDAR, a microphone, an inertial measurement unit (IMU), or a gyroscope. In some implementations, the sensor(s) 116 include multiple cameras, multiple radars, and multiple lidars. In some implementations, at least a portion of the sensor(s) 116 are located at the vehicle 100 such that a substantially 360 degree surrounding of a vehicle 100 can be monitored using data collected by the sensor(s). In some implementations, a substantially 360 degree surrounding of the vehicle 100 includes a region in front of the vehicle 100, a region to the left of the vehicle 100, a region to the right of the vehicle 100, and a region behind the vehicle 100. In some implementations, a substantially 360 degree surrounding of the vehicle 100 includes at least 300 degrees around the vehicle 100, at least 325 degrees around the vehicle 100, at least 350 degrees, or around the vehicle 100, at least 355 degrees around the vehicle 100, at least 358 degrees around the vehicle 100, at least 359 degrees around the vehicle 100, etc. In some implementations, one or more of the sensor(s) 116 are located at the vehicle 100 and positioned such that a facial expression and/or body posture of a driver of the vehicle 100 can be captured. For example, a camera can be located within a cabin of vehicle 100 and positioned to capture a facial expression and/or body posture of a driver of the vehicle 100.

Any of the processors 156, 176, 186, and 196 can be or include, for example, a hardware based integrated circuit (IC), or any other suitable processing device configured to run and/or execute a set of instructions or code. For example, the processors 156, 176, 186, and/or 196 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processors 156, 176, 186, and 196 can be configured to run any of the methods and/or portions of methods discussed herein.

Any of the memory 111, 113, 115, and 117 can be or include, for example, a random-access memory (RAM), a memory buffer, a hard drive, a read-only memory (ROM), an erasable programmable read-only memory (EPROM), and/or the like. In some instances, the memory 111, 113, 115, and/or 117 can store, for example, one or more software programs and/or code that can include instructions to cause their associated processors to perform one or more processes, functions, and/or the like. In some implementations, the memory 111, 113, 115, and/or 117 can include extendable storage units that can be added and used incrementally. In some implementations, the memory 111, 113, 115, and/or 117 can be a portable memory (e.g., a flash drive, a portable hard disk, and/or the like) that can be operatively coupled to their associated processors. In some instances, a remote database device (not shown) can serve as a memory and be operatively coupled to the compute device(s) 104 of the vehicle 100, the search engine(s) 1356, the data warehouse(s) 132, and/or the user compute device(s) 164.

In some implementations, the memory 111, 113, 115, and/or 117 also stores a representation of CAN data. For example, the representation of CAN data can be consistent with the representation of CAN data found in U.S. patent application Ser. No. 17/735,823, incorporated herein in its entirety. The vehicle 100 can include multiple electronic control units (ECUs), such as an engine control module (ECM), a powertrain control module (PCM), a transmission control module (TCM), a brake control module (BCM), a central control module (CCM), a central timing module (CTM), a general electronic module (GEM), a body control module (BCM), a suspension control module (SCM), and/or the like. The CAN data can include for example representations of communications between multiple ECUs. In some implementations, the CAN data can include for example information about a state of the vehicle 100, such as the vehicle's 100 speed, location, tire pressure, internal temperature, audio being played, lights that are on, windshield wiper setting, window settings, tractor and trailer state, and/or the like. Additionally, the CAN data can include information of a change of state of the vehicle 100, such as a change in the vehicle's 100 speed, a change in the vehicle's 100 location, a change in the vehicle's 100 tire pressure, a change in the vehicle's 100 internal temperature, a change in audio being played by the vehicle 100, a change in light settings of the vehicle 100, a change in windshield wiper settings of the vehicle 100, a change in window settings of the vehicle 100, and/or the like.

The network 124 can be any suitable communications network for transferring data, operating over public and/or private networks. For example, the network 124 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 124 can be a wireless network such as, for example, a Wi-Fi or wireless local area network ("WLAN"), a wireless wide area network ("WWAN"), and/or a cellular network. In other instances, the network 124 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The network 124 can also include a local area network (e.g., a network associated with an association, a building, a campus or other relatively small geographic space), a telephone network, a data network associated with a telephone/voice provider (e.g., a mobile communications provider data and/or voice network), a direct connection between one or more compute devices and any combinations thereof. A network can employ a wired and/or a wireless mode of communication. In general, any network topology can be used. Information (e.g., data, software etc.) can be transmitted to and/or from a computer and/or the compute device 104. The communications sent via the network 124 can be encrypted or unencrypted. In some instances, the communication network 124 can include multiple networks or subnetworks operatively coupled to one another by, for example, network bridges, routers, switches, gateways and/or the like (not shown). The network 124 can also include a combination of wired and/or wireless networks operatively coupled to one another.

The memory 117 stores instructions for the processor 156 to receive the sensor data 111 generated by the sensor(s) 116 during operation of the vehicle 100. The sensor data 110 can also be transmitted to the search engine(s) 136, the data warehouse(s) 132, and/or the user compute device(s) 164 via the network 124, for storage in their associated memory. The operation of the vehicle 100 can include driving, turning, parking, reversing, braking, and/or the like. In some cases, the memory 117 contains instructions to further cause the processor 156 to capture the sensor data 111 over a continuous period of time in short intervals. For example, the sensor(s) 116 can capture image frames in intervals of about 10 seconds, and the captured image frames can be received and/or processed by the processor 156 using a sliding window of frames (e.g., to generate/extract features).

The memory 111 of the search engine(s) 136 can store instructions for the processor 176 to cause storage of the sensor data 110 in a queryable search engine index of the indexing system 111I. The queryable search engine index optionally contains previous/historical sensor data or multidimensional representations thereof (e.g., as the multidimensional representations 111J). The queryable search engine index 136 can include a forward index and/or an inverted index. The queryable search engine index 136 can be searched and/or queried based on an input from the user compute device(s) 164 and/or from the vehicle 100, using processor 176.

As discussed above, the data warehouse(s) 132 can include natural language descriptors 113H and index data 113D. The index data 113D can be stored in records with associated natural language descriptors 113H, and thus can be queried using natural language. The natural language descriptors 113H can include natural language descriptions of driving scenarios. A "predefined natural language scenario description," as used herein, can refer to a natural language scenario description associated with sensor data (such as sensor data 110). As an illustrative example, the sensor data 110 can include a video frame and/or image frames of a pothole in the road, and the memory 113 may already store a predefined natural language scenario description for the pothole on the road, generated based on previous sensor data. In other cases, the sensor data 111 can include a scenario not previously identified or stored in the data warehouse(s) 132 (i.e., a "new scenario"). In such instances, the a new natural language scenario description may be generated for the new scenario and added to the natural language descriptors 113H. The generation of the new lateral language scenario description can be generated by first converting the associated sensor data into a multidimensional representation of that sensor data and using the multidimensional representation to query the search engine(s) 136 and identify one or more candidate classifications. Alternatively or in addition, the generation of the new lateral language scenario description can include automatic labelling and/or manual (human) labeling with a specific natural language description. In some examples, the natural language scenario description for a driving scenario involving objects in/on a roadway can include descriptions such as "non-painted speed bumps," "road debris," "protruding lane beams," and/or the like.

The memory 113 of the data warehouse(s) 132 also stores instructions to cause the processor 186 to produce one or more query result(s) 113B in response to one or more queries 113B, the query result(s) 113B including a subset of records from multiple records of the data warehouse(s) 132. A "subset of records," as used in this disclosure, can refer to a subset of natural language scenario descriptions from the natural language descriptors 113H. For example, the query result(s) 113C for a query 113B for animals obstructing traffic, as described with a natural language scenario descriptor 113H of "animals," can produce query result(s) 113B such as "body of a medium size deer on top of left lane mark obstructing part of the lane," "family of ducks and chicks crossing the road," "roadkill of a squirrel in the middle lane," and/or the like. In some cases, each entry in the data warehouse(s) 132 is a record from which a subset of records can be derived based on a natural language based query.

In some implementations, and still referring to FIG. 1B, the indexing system 111I of the search engine(s) 136 and/or the index data 113D of the data warehouse(s) 132 can include indices that are constructed using a sequential model, such as a recurrent neural network (RNN), which produces sequential features over one or more sliding windows of frames. Other features in the indexing system can be features extracted from individual frames or other sensor data. For example, a "frame" can refer to a collection of time series data 120 and/or sensor data captured by at least one sensor 116 such as cameras, lidars, radars, GPS, IMU, and/or the like, within a very short interval. As used in this disclosure, a "very short interval," can refer to intervals under 1/10 of a second (100 ms). In some cases, the RNN can include a long short-term memory (LSTM) network. The LSTM can produce a sequence output as described above, such as sequential features over the sliding window of frames. The LSTM can be provided with sensor data 111A and/or time series data and be queried (e.g., with a predefined natural language scenario description), and can output query result(s) 113C that describe occurrences represented by the sensor data 111A and/or time series data, or by sufficiently similar data. In some implementations, the predefined natural language scenario description can be sent (to, and received and processed at, the data warehouse(s) 132 and/or the search engine(s) 136.

In some implementations, the querying of the search engine(s) 136 can be conducted on a compute device that is located at a remotely from vehicle 100. A "remote device," as used in this disclosure, can refer to or include any compute device, including but not limited to a mobile device such as a smartphone, tablet, laptop, desktop, and/or the like that is distinct and physically located separately from (and not disposed on) vehicle 100. For example, the remote device can include one of, or any combination of, the search engine(s) 136, the data warehouse(s) 132, or the user compute device(s) 164. An input can be received by remote device via any network (e.g., network 124) and/or using any network methodology as described herein. The remote device is an off-board system while the compute device(s) 104 is an on-board system on the vehicle 100. The remote device can be configured to perform/execute natural language-based queries, indexing of sensor data (and/or multidimensional representations thereof), and/or training of machine learning model(s). In some implementations, the remote device can also cause the machine learning model(s) to be deployed on the vehicle(s) 100 (i.e., on-board compute device(s) 104 of the vehicle(s) 100), by delivering the machine learning model(s) via the connection through the network 124. The remote device can be hosted, for example, by a remote server. A "remote server," as used in this disclosure, can refer to a server (or any other type of appropriate compute device) that can host software applications to provide access to shared data. In some cases, queries are conducted remotely from the vehicle(s) 100, by the remote device, and the resulting query results may be analyzed remotely from the vehicle(s) 100 and/or sent to one or more of the vehicle(s) 100 (e.g., via network 124). The remote device can include a larger/faster memory and processor that can generate query results more quickly than would be possible if the query were run by the processor 156 of the vehicle 100. In other implementations, queries may be performed via the processor 156 of the vehicle(s) 100. In some implementations, the memory of the remote device can include (and/or the remote device can access) an indexing system that can be used to index new data and/or to query existing/stored data, as described herein.

An "indexing system," as used in this disclosure, can refer for example to a hardware/software system used to assign indices to data or data records, and to process queries (which can include natural language scenario descriptions) to generate query results based on the indices. In some implementations, the remote device can receive multiple time series data from multiple vehicles and improve and/or update a scenario framework 156 containing safety cases by adding more safety cases based on the natural language description(s) of the scenario framework 156. The indexing system at the remote device can also be configured to capture/identify more scenarios (whether "edge cases" or not), which in turn can be used to train or retrain machine learning models (e.g., machine learning model(s) 115B) and/or to supplement or add to the scenario data 111E of the search engine(s) 136, the edge cases 111D of the search engine(s) 136, the scenario data 113E of the data warehouse(s) 133, and/or the edge cases 113I of the search engine(s) 136. The indexing system at the remote device can also expand the scenario framework by leveraging the search engine(s) 136 to generate/construct (optionally automatically) new natural language-based descriptions based on newly received sensor data or multidimensional representations thereof. The indexing system at the remote device can also be configured to evaluate the rareness of the newly-received sensor data (or multidimensional representations thereof) based on their similarities with other edge case(s) and/or scenario data already stored or accessible by the indexing system.

Alternatively or additionally, the indexing system can be deployed as part of the compute device(s) 104 of the vehicle(s) 100. The indexing system and/or one or more machine learning models can be deployed on the vehicle(s) 100 and used to identify/discover new scenarios and/or edge cases on the vehicle(s) 100, for example by running an onboard search engine (i.e., a queryable search engine index that is separate from the search engine(s) 136) to match newly observed sensor data against the queryable search engine index, to find similar cases or matching descriptions (e.g., records).

In some such implementations, the memory 117 of the vehicle(s) 100 can store instructions to further cause the processor 156 to rank each record from a subset of identified records based on a relevancy of that record to a predefined natural language scenario description 132 to produce a ranked set 144 of records. For example, the memory 117 can store instructions to cause the processor to query the onboard queryable search engine index using the predefined natural language scenario description (e.g., provided by a user via a user interface of the vehicle(s) 100 and/or provided by a user via a mobile device of the user), and the queryable search engine index can output the subset of records based on the query. A "ranked set" or "ranked set of records," as used in this disclosure, can refer to a set of query result(s), the query results of which are ranked according to their relevance to the query (e.g., including a predefined natural language scenario description, sensor data, and/or a multidimensional representation of sensor data). In some implementations, the ranking can be performed by scoring each query result. For example, each query result can have a score between 0 and 100, where 100 is the highest score in relevance to the query. The remote device can be configured to perform query processing, ranking of query result(s), and, optionally, automatic deduplication of the ranked set of query result(s), independently from the vehicle(s) 100. The vehicle(s) 100 and its components are responsible for autonomous functions of the vehicle 100 and collection of sensor data 110, and optionally for the detection of edge cases and/or driving scenarios.

The memory of the remote device can also store instructions for the processor to train a machine learning model (e.g., machine learning model(s) 115B), for subsequent deployment on one or more vehicles. In some cases, the machine learning model can include an end-to-end machine learning model, a type of machine learning model that uses a technique where the model learns all the steps or transformations between an initial input phase and a final output result. The end-to-end machine learning model can be generated via a deep learning process in which multiple parts of the end-to-end machine learning model are simultaneously (rather than sequentially) trained. The machine learning model can be trained for vehicle operation (e.g., autonomous driving functions) as well as to identify, classify, validate, and/or categorize edge case(s), which in turn can be used to expand the scenario framework. In some implementations, edge case(s) can be used (e.g., as training data) to retrain the machine learning model for improved detection/validation of future edge case(s) and/or to target specific scenarios of interest within the scenario framework. The machine learning model can be trained remotely from the vehicle 100, and once sufficiently trained, the machine learning model can be deployed/transmitted to the vehicle 100. Alternatively or additionally, an indexing system can be copied into the memory 117 of the vehicle(s) 100. The machine learning model can be trained with a set of training data including a sample of selected natural language descriptions correlated to a safety case. The training data can include data samples from one or more data corpora generated offline (i.e., not generated at the vehicle). In some implementations, the machine learning model can be trained with a training and/or validation dataset containing edge case(s) selected to provide, to the machine learning model, a "bias" or ability to identify new edge cases. The memory can include instructions for the processor to sample (optionally deduplicated) edge case(s) automatically, and the sampled edge cases can be selected to expand a scenario framework and/or safety protocol(s) (e.g., by adding the selected edge cases thereto). Alternatively or in addition, samples produced/selected from the search engine 136 and/or the data warehouse(s) 132 (e.g., in response to a query containing multidimensional representation(s) of sensor data and/or containing natural language scenario descriptions) can be included in a training dataset and/or a validation dataset for machine learning model training/retraining. Machine learning models can be trained remotely from the vehicle(s) 100 and in one or more remote devices described herein. The machine learning models can be trained with additional training sets. In other words, the training of machine learning model(s) is not limited to data solely retrieved from the processes as described above. Additional training data can include samples of natural language scenario descriptions of specific driving scenarios and/or edge cases, for example to create/impose a bias for the machine learning model(s).

In some implementations, one or more machine learning models (e.g., machine learning model(s) 115B) are trained in a single iteration. In other implementations, the machine learning model(s) are iteratively trained to improve their predictive power and/or to improve their ability to detect newly discovered edge cases (which, in turn, can be incorporated into the scenario framework 156, for example the safety protocol described below with reference to FIG. 2). The search engine(s) 136, data warehouse(s) 132, and natural language-based queries described herein can be used for one or more of: (1) building and expanding a scenario framework and safety cases, (2) augmenting a machine learning training set with selected edge cases for improved classification and/or ability to handle specific types of edge cases, or (3) augmenting a machine learning validation set with selected edge cases such that the machine learning validation set better represents an overall range of safety scenarios.

A "scenario framework," as used in this disclosure, can refer to a hierarchical framework of safety cases categorized in various safety-based scenario classifications, driving scenario types, sub-types, specific scenarios, and/or the like, residing within and/or distributed across one or more search engines, data warehouses, vehicles, and/or user compute devices (such as those shown and described with reference to FIG. 1B). The hierarchical structure of the scenario framework 156 can include, for example, at least two, at least three, or at least four distinct categorization levels and/or layers, as described herein.

In some embodiments, once a machine learning model has been trained, the machine learning model can be transmitted to/deployed on the vehicle(s) 100. The scenario framework can be continuously expanded with additional and/or modified edge cases, safety cases, driving scenarios, or the like (e.g., identified using the machine learning model and/or based on new batches of sensor data or natural language scenario descriptions). The scenario framework can be enriched using predefined natural language scenario descriptions. A "predefined" natural language scenario description can refer to a natural language scenario description that already resides in the scenario framework. The memory can store instructions to cause the processor to automatically categorize new edge cases to the scenario framework. In some cases, the enriched scenario framework can include new safety cases and/or edge cases that can be included in a training set to retrain and/or validate the machine learning model. In some instances, the enriched scenario framework is not configured to discover/identify unknown edge cases (i.e., scenarios not previously identified by or represented within the scenario framework) automatically, and classification of unknown edge cases is performed by a human user, in which case sensor data (or multidimensional representations thereof) is categorized in response to a user input.

In some embodiments, a signal is received by a compute device (e.g., of the system in FIG. 1A or 1B) representing a user selection of at least one edge case from a set of edge case(s) for inclusion in a safety protocol (e.g., safety protocol(s) 115C). In some cases, the signal can originate from a user device (e.g., user compute device(s) 164) operated by a user. A "user device," as used in this disclosure, can refer to a compute device 104 operated by a user to communicate inputs for a vehicle and the scenario framework. In some other cases, the user device can be located in the vehicle 100 for a user in the vehicle 100 to interact with. The user device can include a display interface for the user to interact with. A "display interface," as used in this disclosure, can refer to a user interface that allows a user to interface with the user device through graphical icons, audio indicators, touch inputs, command labels, text navigation and the like. The display interface can include a form or other graphical interface having display fields by which one or more pieces of information can be displayed. The display interface can include one or more objects, such as a drop down list, slider, menu, grid of icons, or other user commands that can allow a user to select one or more characters. The display interface can include free form textual entries, where a user can type in responses and/or messages. The display interface can display data output fields including text, images, or the like. The display interface can include data input fields such as text entry windows, drop-down lists, buttons, checkboxes, radio buttons, sliders, links, or any other data input interface that can capture user interaction. The display interface can be provided, without limitation, using a web browser, a native application, a mobile application, and/or the like.

In some embodiments, the user device, which can be a remotely located device, can be connected to vehicle(s) 100 and its compute device(s) 104 via the network 124. The user operating the user device can view query results (optionally deduplicated) from a ranked set of query results, and can select one or more edge cases (or other scenarios of interest), thereby causing transmission of a signal via the network 124 to cause an update to the safety protocol(s) 115C such that the safety protocol(s) 115C includes the selected one or more edge cases. The user selection can also represent confirmation that a query result from the ranked set of query results is legitimate (e.g., was properly returned in response to the query preceding it), valid, expected, not yet covered by the safety protocol(s), and/or of interest. Alternatively or in addition, human intervention can be used to confirm machine learning model predictions (e.g., of edge cases).

A "safety protocol," as used in this disclosure, can refer to a set of actions or responses for a vehicle and/or driver to safely perform in response to an edge case(s). In some cases, the safety protocol(s) can be included in the scenario framework as another layer in the hierarchical structure, where each edge case corresponds to one or more protocols of the safety protocol(s). For example, as shown and described with reference to FIG. 2 below, in some cases, safety protocol(s) can be its own layer containing protocols for one or more associated edge case(s), and the associated edge case(s) can reside in their own layer (e.g., the fifth layer, represented as "L5 Edge Case" in FIG. 2) within the hierarchy of the scenario framework. As an example, the safety protocol(s) for an edge case driving scenario described as "twin size mattress blocking off ramp" can have a safety protocol(s) such as "slow down and change lanes to avoid obstacle."

In some embodiments, a machine learning model can be iteratively trained based on representations of one or more edge case(s). The training of the machine learning model can be described as creating a robust machine learning model for use in formulating/generating safety protocols that are sufficiently accurate (e.g., above a predefined accuracy threshold) without user input. The trained machine learning model can be retrained over time based on subsequently-received sensor data. Features for the subsequently-received sensor data can be used to generate features or indices, for example using one or more sliding windows of different image frames and/or video frames from the sensor data.

During operation of vehicle(s) 100, the vehicle(s) 100 may experience different driving environments and generate associated contemporaneous sensor data. The sensor data can be used at a later time, as described herein, to perform edge case detection and/or to update the scenario framework. Alternatively or in addition, the sensor data can be used in real-time or substantially in real-time, to continuously and dynamically perform edge case detection and/or update the scenario framework. In some embodiments, a first query can be run on the search engine(s) 136 and/or the data warehouse(s) 132 at a first time to obtain a first result, and a second query identical to the first query (or similar to the first query) can be run on the search engine(s) 136 and/or the data warehouse(s) 132 at a second time to obtain a second result, with the second result being different from, and potentially more accurate than, the first query result due to updates applied to the scenario framework between the first time and the second time.

In some embodiments, query results can be automatically ranked based on their relevancy to the query that they were generated in response to. The ranked query results (or a subset thereof) can be used to update the search engine(s) 136 and/or the data warehouse(s) 132, and/or can be used to train/retrain a machine learning model for controlling a vehicle. Alternatively or in addition, updates to the search engine(s) 136 and/or the data warehouse(s) 132, and/or training/retraining of a machine learning model for controlling a vehicle can be triggered in response to one or more user inputs. FIG. 2 is an example table of a natural language-based safety protocol of a scenario framework, the safety protocol having a hierarchical structure, in accordance with an embodiment. The table includes five distinct categorization levels and/or layers. For example, the table includes a first layer titled "L1 Class" describing the classification of driving scenarios, a second layer titled "L2 Type" describing the type of driving scenarios from a corresponding classification in the first layer, a third layer titled "L3 Sub-type" describing the sub-type of the driving scenarios from a corresponding scenario type of the second layer, a fourth layer titled "L4 Scenario" describing the specific driving scenario found in the sub-types of the third layer, and a fifth layer titled "L5 Edge Case" describing the edge case selected from a user input as described above in FIG. 1. In some cases, each of the edge cases in the fifth layer can be associated with a safety protocol, which itself can be categorized in a sixth layer.

Figure 3:
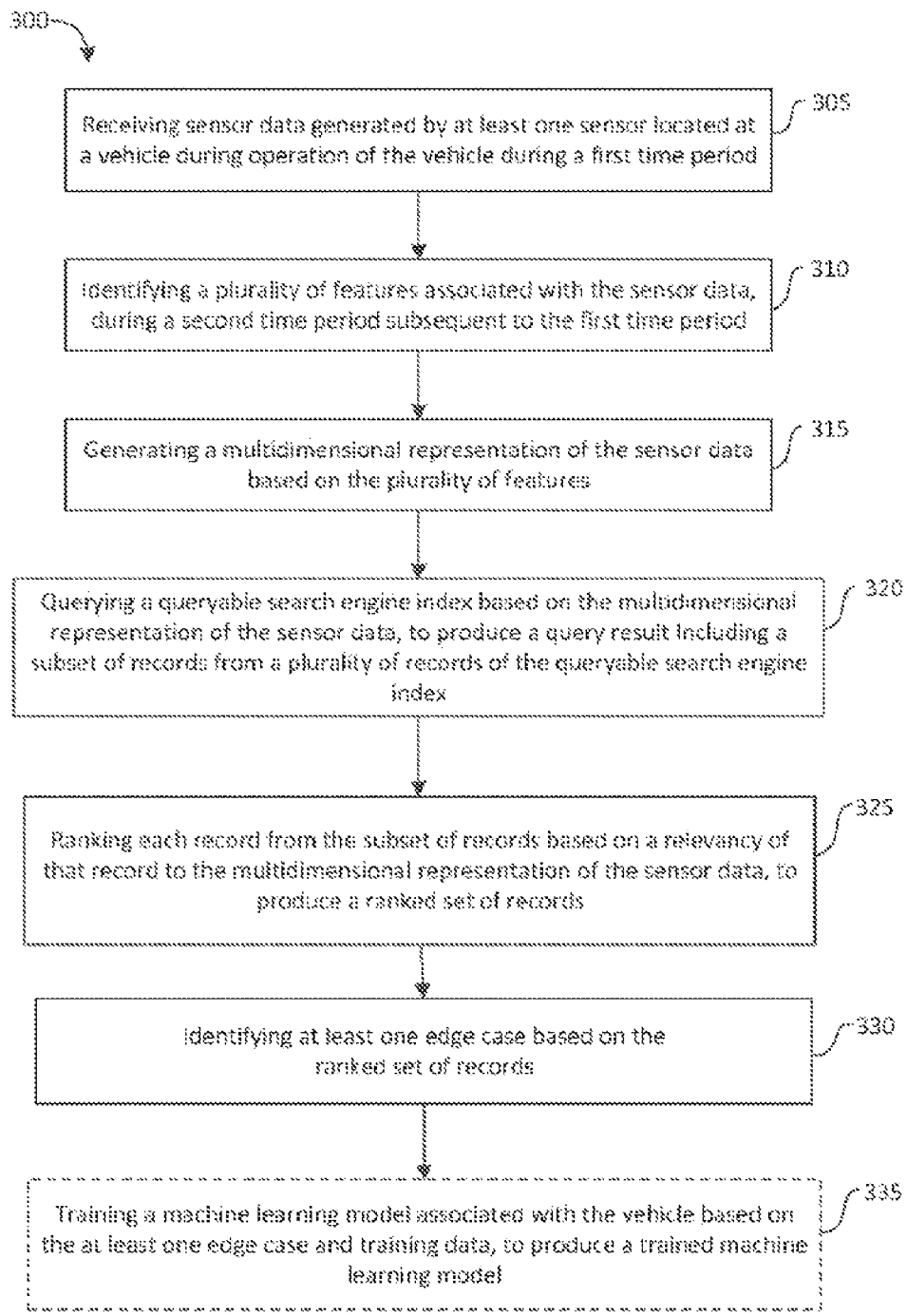
FIG. 3 is a flow diagram of a method for identifying edge cases and training a vehicle-related machine model, in accordance with some embodiments.

FIG. 3 is a flow diagram of a method for identifying edge cases and training a vehicle-related machine model, in accordance with some embodiments. As shown in FIG. 3, the method 300 (which can be implemented, for example, using one of or any combination of the search engine(s) 136, the data warehouse(s) 132, the user compute device(s) 164, and/or the compute device(s) 104 of the vehicle(s) 100 of FIG. 1B), includes receiving sensor data at 305. The sensor data includes sensor data generated via at least one sensor during operation of a vehicle (e.g., the vehicle(s) 100 in FIG. 1B). The sensor data can include, for example, a plurality of frames, each frame from the plurality of frames being associated with about a 0.1 second capture duration. At 310, the method 300 includes identifying a plurality of features associated with the sensor data, and at 315, a multidimensional representation of the sensor data is generated based on the plurality of features. A queryable search engine index (e.g., the indexing system 111I of search engine(s) 136 in FIG. 1B) is queried, at 320, based on the multidimensional representation of the sensor data, to produce a query result including a subset of records from a plurality of records of the queryable search engine index. At 325, each record from the subset of records is ranked based on a relevancy of that record to the multidimensional representation of the sensor data, to produce a ranked set of records. At least one edge case is identified at 330 based on the ranked set of records, and a machine learning model associated with the vehicle is optionally trained, at 335, based on the at least one edge case and training data, to produce a trained machine learning model. In some implementations, the method 300 is performed automatically and/or iteratively any suitable number of times.

In some implementations, the sensor data includes video frames. In other implementations, the sensor data includes at least one of camera data, lidar data, radar data, global positioning system (GPS) data, or inertial measurement unit (IMU) data. Each record from the plurality of records can be constructed using a recurrent neural network (e.g., a long short-term memory (LSTM) network).

In some embodiments, the sensor data is a first sensor data, and the method 300 also includes iteratively retraining the trained machine learning model over time based on subsequently-received sensor data. The iterative retraining of the trained machine learning model can be performed based on the subsequently-received sensor data.

In some embodiments, the method 300 also includes receiving a signal representing a user selection of an edge case from the at least one edge case for inclusion in a safety protocol, and causing an update to the safety protocol such that the safety protocol includes the user-selected edge case. At least one of the queryable search engine index or the safety protocol can have a hierarchical structure having, for example, at least four distinct categorization levels.

Figure 4:
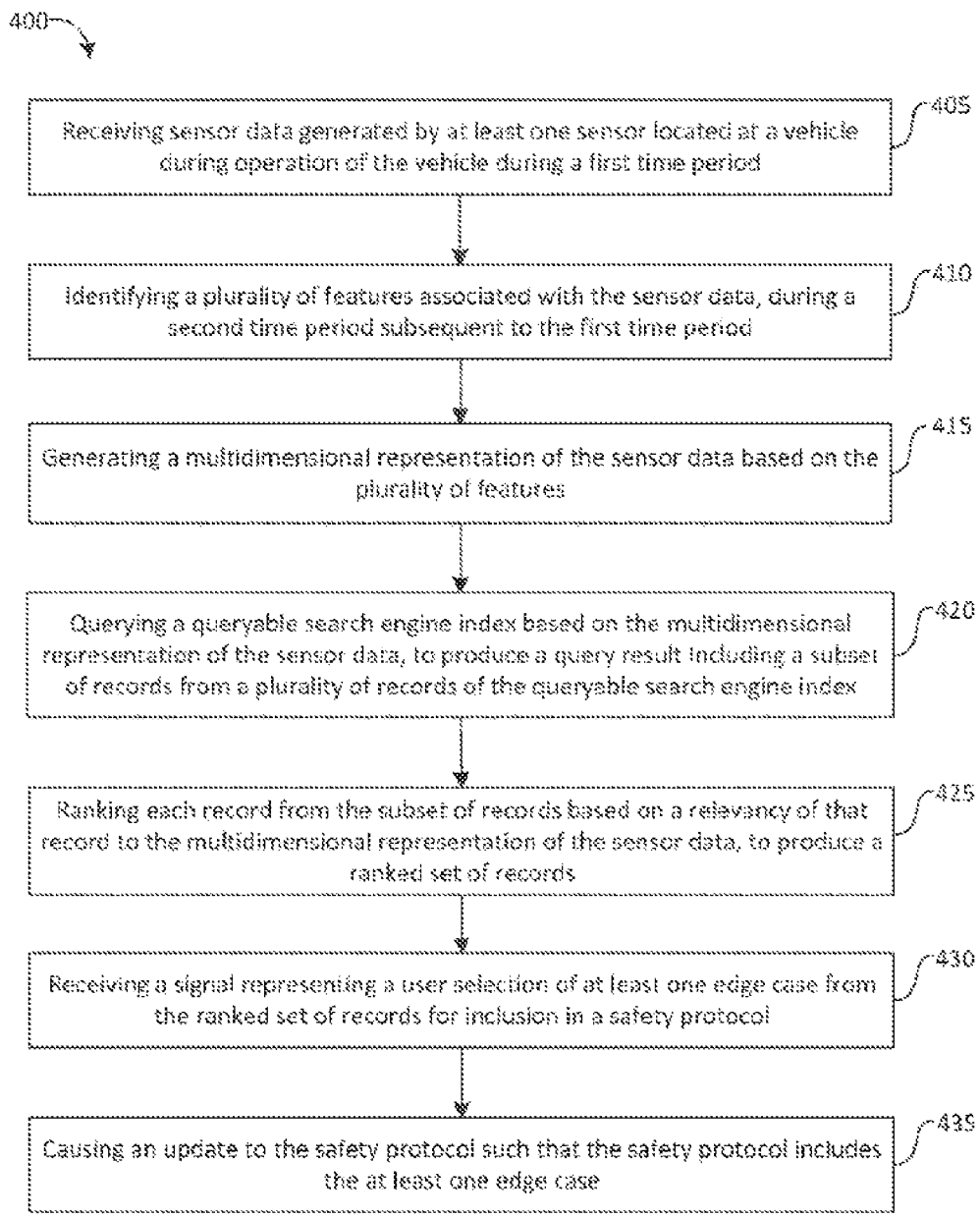
FIG. 4 is a flow diagram of a method for identifying at least one edge case and updating a safety protocol based on the edge case(s), in accordance with some embodiments.

FIG. 4 is a flow diagram of a method for identifying at least one edge case and updating a safety protocol based on the edge case(s), in accordance with some embodiments. As shown in FIG. 4, the method 400 (which can be implemented, for example, using one of or any combination of the search engine(s) 136, the data warehouse(s) 132, the user compute device(s) 164, and/or the compute device(s) 104 of the vehicle(s) 100 of FIG. 1B), includes receiving, at 405, sensor data generated by at least one sensor located at an autonomous vehicle during operation of the autonomous vehicle. The sensor data can include at least one of camera data, lidar data, radar data, global positioning system (GPS) data, or inertial measurement unit (IMU) data. At 410, a plurality of features associated with the sensor data is identified, and at 415, a multidimensional representation of the sensor data is generated based on the plurality of features. A queryable search engine index is queried at 420, based on the multidimensional representation of the sensor data, to produce a query result including a subset of records from a plurality of records of the queryable search engine index. Each record from the subset of records is ranked at 425 based on a relevancy of that record to the multidimensional representation of the sensor data, to produce a ranked set of records. At 430, a signal is received representing a user selection of at least one edge case from the ranked set of records for inclusion in a safety protocol, and at 435, an update to the safety protocol is triggered/caused, such that the safety protocol includes the at least one edge case. In some implementations, at least one of the queryable search engine index or the safety protocol has a hierarchical structure (e.g., including at least four distinct categorization levels). Alternatively or in addition, at least one of the queryable search engine index or the safety protocol can include a plurality of predefined natural language scenario descriptions. Alternatively or in addition, each record from the plurality of records can be constructed using a recurrent neural network.

In some embodiments, the method 400 also includes training a machine learning model associated with the autonomous vehicle based on the at least one edge case, to produce a trained machine learning model.

In some embodiments, the sensor data includes a plurality of frames, and each frame from the plurality of frames is associated with a capture duration of about 0.1 seconds.

As discussed herein, in accordance with some embodiments, sensor data generated by one or more vehicles (e.g., autonomous vehicles) can be used in the identification or discovery of "safety cases" or "edge cases," which can be scenarios of interest within a scenario framework, for example due to their being potentially relevant to vehicle and/or passenger safety. A given set of sensor data can first be converted into a set of features (e.g., abstracted representations of the sensor data, which can be, for example, a single image frame or sequence of images or other sensor data, optionally with timestamp information embedded therein). The set of features can include, for example, color distribution, intensity, time change information, color change information, etc.). The features from the set of features can be referred to as "descriptors" and/or can include time series data. The conversion of the sensor data into the set of features can be performed, for example, as follows: begin with a kernel of the sensor data (e.g., a 3×3 pixel array) and merge the sensor data for that kernel with data for other pixels or pixel arrays. The merging can be performed based on a fixed formula, and vector generation can be performed based on the merged data, resulting in a single vector (e.g., for a single image) or a set of vectors (e.g., for a series or set of images). The vector generation can be performed in a variety of different ways, and optionally includes the detection of sharp edges (e.g., within an image or image set). The vector(s) can be regarded as multidimensional representations of the sensor data, and can be used to query a search engine as described herein. The search engine may include a plurality of "documents" or previous sets of sensor data (or representations thereof), which themselves may be indexed by their associated features). Prior to or as part of the query, the vector(s) may be broken up/segmented into multiple smaller vectors. The query result resulting from the query can be used to assess/determine one or more of: how rare the sensor data is, how common the sensor data is, what classification (or candidate classifications) or category (or candidate category) should be assigned to or associated with the sensor data, how similar the sensor data is to historical sensor data, how representative the sensor data is with regard to a specified scenario, whether the sensor data represents a new edge case, or whether or not a scenario represented by the sensor data has previously been saved in or identified by the search engine. The query results can include "matched" sensor data and/or multidimensional data (such as a complex matrix representation of multiple categories, distributions, sensor data, etc.). In some implementations, each edge case defined as a result of the querying includes scenario information and an associated rareness value. Alternatively or in addition, each indexed record in the search engine can include scenario information and an associated rareness value. In some cases, although a given set of sensor data may be classified as a result of the query results, the set of sensor data may not necessarily be added to the search engine. For example, the search engine can be updated only when strict confidence or other metrics are met and/or only when an administrative user authorizes the addition of a new record containing the set of sensor data to the search engine.

In some embodiments, a data warehouse as described herein is used primarily as a queryable repository for sensor data, or a large corpus of previously classified/categorized data from which scenario data/edge case data can be retrieved. The data warehouse can be queryable using a natural language query. Optionally, the natural language query may be converted into a different form/representation (e.g., a set of conditions) prior to running the query of the data warehouse. Alternatively, a deep learning representation of the natural language query (e.g., with hidden representation(s)) may be generated prior to running the query of the data warehouse. Query results can be ranked by similarity, rareness, etc.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, subroutines, functions, procedures, etc. "Instructions" and "code" can comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method comprising:
    performing, by a computing system, a natural language query based on sensor data obtained by a vehicle against a data store;
    determining, by the computing system, rareness of a plurality of records associated with safety cases determined as a query result for the query, wherein rareness of a safety case is inversely related to a frequency of occurrence of similar safety cases in the query result;
    identifying, by the computing system, an edge case from the plurality of records associated with a framework for vehicle navigation; and
    training, by the computing system, a machine learning model based at least in part on the edge case.

2. The computer-implemented method of claim 1, wherein the data store is associated with a queryable search engine index.

3. The computer-implemented method of claim 2, wherein the search engine index is associated with indices generated based on a recurrent neural network (RNN) that produces sequential features over sliding windows of frames.

4. The computer-implemented method of claim 1, wherein each safety case is associated with a candidate classification for the sensor data and an indication of rareness.

5. The computer-implemented method of claim 4, wherein a safety case is identified as the edge case based on a rareness score associated with the safety case that satisfies a threshold value.

6. The computer-implemented method of claim 1, wherein the natural language query is associated with a natural language-based scenario description.

7. The computer-implemented method of claim 6, wherein the plurality of records are ranked based on relevancy to the natural language-based scenario description.

8. The computer-implemented method of claim 7, wherein the framework is a hierarchical scenario framework including the safety cases categorized in safety-based scenario classifications, driving scenario types, sub-types, and specific scenarios.

9. The computer-implemented method of claim 8, wherein the edge case is added to the hierarchical scenario framework.

10. The computer-implemented method of claim 1, wherein the edge case is included in a safety protocol associated with a set of actions for the vehicle to perform in response to the edge case.

11. A system comprising:
    at least one processor; and
    a memory storing instructions that, when executed by the at least one processor, cause the system to perform operations comprising:
    performing a natural language query based on sensor data obtained by a vehicle against a data store;
    determining, by the computing system, rareness of a plurality of records associated with safety cases determined as a query result for the query, wherein rareness of a safety case is inversely related to a frequency of occurrence of similar safety cases in the query result;
    identifying an edge case from a plurality of records associated with a framework for vehicle navigation; and
    training a machine learning model based at least in part on the edge case.

12. The system of claim 11, wherein the data store is associated with a (Original) queryable search engine index.

13. The system of claim 12, wherein the search engine index is associated with indices generated based on a recurrent neural network (RNN) that produces sequential features over sliding windows of frames.

14. The system of claim 11, wherein a query result in response to the query specifies safety cases, each safety case associated with a candidate classification for the sensor data and an indication of rareness.

15. The system of claim 14, wherein a safety case is identified as the edge case based on a rareness score associated with the safety case that satisfies a threshold value.

16. A non-transitory computer-readable storage medium including instructions that, when executed by at least one processor of a computing system, cause the computing system to perform operations comprising:
    performing a natural language query based on sensor data obtained by a vehicle against a data store;
    determining, by the computing system, rareness of a plurality of records associated with safety cases determined as a query result for the query, wherein rareness of a safety case is inversely related to a frequency of occurrence of similar safety cases in the query result;

identifying an edge case from a plurality of records associated with a framework for vehicle navigation; and training a machine learning model based at least in part on the edge case.

17. The non-transitory computer-readable storage medium of claim 16, wherein the data store is associated with a queryable search engine index.

18. The non-transitory computer-readable storage medium of claim 17, wherein the search engine index is associated with indices generated based on a recurrent neural network (RNN) that produces sequential features over sliding windows of frames.

19. The non-transitory computer-readable storage medium of claim 16, wherein a query result in response to the query specifies safety cases, each safety case associated with a candidate classification for the sensor data and an indication of rareness.

20. The non-transitory computer-readable storage medium of claim 19, wherein a safety case is identified as the edge case based on a rareness score associated with the safety case that satisfies a threshold value.

\* \* \* \* \*